(12) United States Patent
Crompton et al.

(10) Patent No.: US 11,018,481 B1
(45) Date of Patent: May 25, 2021

(54) CABLE SECURING DEVICE

(71) Applicant: Quick Fitting, Inc., Warwick, RI (US)

(72) Inventors: David B. Crompton, Stonington, CT (US); Libardo Ochoa Dias, West Warwick, RI (US); Herbert J. Bouchard, West Greenwich, RI (US)

(73) Assignee: Quick Fitting Holding Company, LLC, Warwick, RI (US)

( * ) Notice: Subject to any disclaimer, the term of this patent is extended or adjusted under 35 U.S.C. 154(b) by 0 days.

(21) Appl. No.: 16/775,505

(22) Filed: Jan. 29, 2020

(51) Int. Cl.
*H02G 1/08* (2006.01)
*F16L 37/091* (2006.01)
*F16G 11/04* (2006.01)
*F16L 21/08* (2006.01)

(52) U.S. Cl.
CPC .......... *H02G 1/081* (2013.01); *F16G 11/048* (2013.01); *F16L 37/091* (2013.01); *F16L 21/08* (2013.01)

(58) Field of Classification Search
CPC ......... H02G 1/081; B66C 1/42; F16G 11/048; F16L 37/091; F16L 21/08; F16L 37/0915
USPC .................. 254/134.3 R, 134.3 FT
See application file for complete search history.

(56) References Cited

U.S. PATENT DOCUMENTS

| | | | |
|---|---|---|---|
| 1,265,141 A | 5/1918 | Trippe | |
| 3,776,586 A | 12/1973 | Ahlgren et al. | |
| 3,852,850 A | 12/1974 | Filhaber | |
| 4,635,989 A | 1/1987 | Tremblay et al. | |
| 5,015,023 A | 5/1991 | Hall | |
| 5,233,730 A | 8/1993 | Milne et al. | |
| 5,369,849 A | 12/1994 | De France | |
| 5,622,642 A | 4/1997 | Edwards et al. | |
| 6,058,574 A | 5/2000 | Facey et al. | |
| 6,883,782 B2 | 4/2005 | Ames et al. | |
| 7,007,350 B1 | 3/2006 | Franke | |
| 7,043,801 B2 | 5/2006 | Toimil | |
| 7,478,794 B1 * | 1/2009 | Gohlke | B66C 1/42 254/134.3 FT |
| 8,292,267 B2 | 10/2012 | Jordan et al. | |
| 8,385,712 B2 | 2/2013 | Ahmed | |
| 8,398,122 B2 * | 3/2013 | Crompton | F16L 37/091 285/340 |

(Continued)

FOREIGN PATENT DOCUMENTS

| | | |
|---|---|---|
| CN | 205387792 | 7/2016 |
| DE | 2250831 | 4/1974 |

(Continued)

OTHER PUBLICATIONS

United States Patent and Trademark Office, International Search Report and Written Opinion for PCT/US2020/015579, dated Apr. 14, 2020.

*Primary Examiner* — Lee D Wilson
*Assistant Examiner* — Mahdi H Nejad
(74) *Attorney, Agent, or Firm* — Williams Mullen; Thomas F. Bergert

(57) ABSTRACT

A cable securing device facilitates secure connection to a cabling end, and employs a retaining cap, a barrel and a cable receiving component. Embodiments of the cable receiving component include a retaining jaw, a spacer gland and a fastening ring maintained within an interior cavity of the barrel. In various embodiments, the cable receiving component is retained in a substantially axially static position within the barrel upon insertion of a cable.

22 Claims, 9 Drawing Sheets

(56) References Cited

U.S. PATENT DOCUMENTS

| | | | |
|---|---|---|---|
| 8,585,019 B2 | 11/2013 | Meisheimer et al. | |
| 8,839,591 B2 | 9/2014 | Guthrie et al. | |
| 8,844,981 B1 * | 9/2014 | Crompton | F16L 37/0915 |
| | | | 285/340 |
| 9,027,908 B1 | 5/2015 | Calhoun et al. | |
| 10,461,514 B2 | 10/2019 | Crompton et al. | |
| 2004/0007874 A1 | 1/2004 | Minami | |
| 2004/0041136 A1 * | 3/2004 | Ames | B66C 1/42 |
| | | | 254/134.3 FT |
| 2009/0224220 A1 | 9/2009 | Jordan et al. | |
| 2009/0238534 A1 | 9/2009 | Ahmed | |
| 2010/0051886 A1 | 3/2010 | Cooke et al. | |
| 2011/0084180 A1 | 4/2011 | Toimil et al. | |
| 2013/0221298 A1 | 8/2013 | Bennett et al. | |
| 2015/0345683 A1 * | 12/2015 | Crompton | F16L 37/091 |
| | | | 285/340 |
| 2018/0003202 A1 | 1/2018 | White et al. | |

FOREIGN PATENT DOCUMENTS

| | | |
|---|---|---|
| EP | 2108874 | 10/2009 |
| JP | 2004286221 | 10/2004 |
| WO | 2004036711 | 4/2004 |

\* cited by examiner

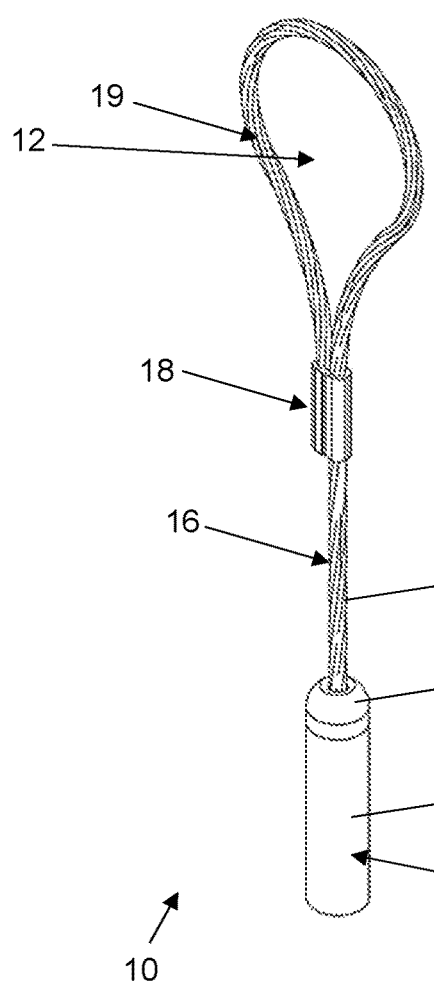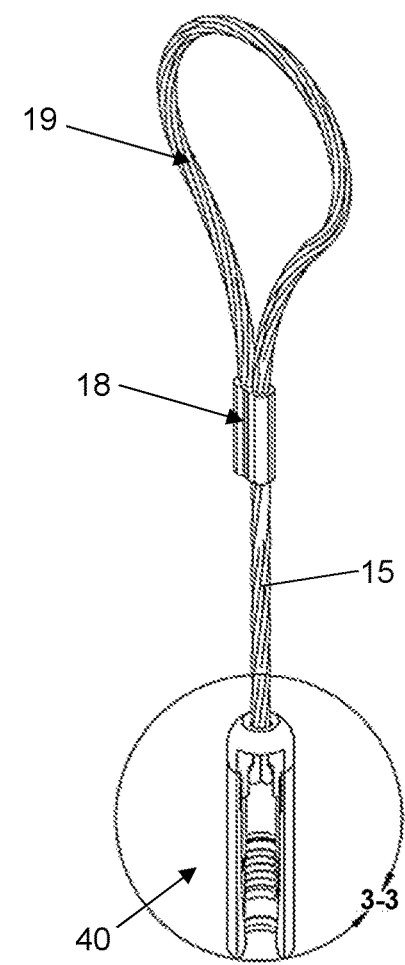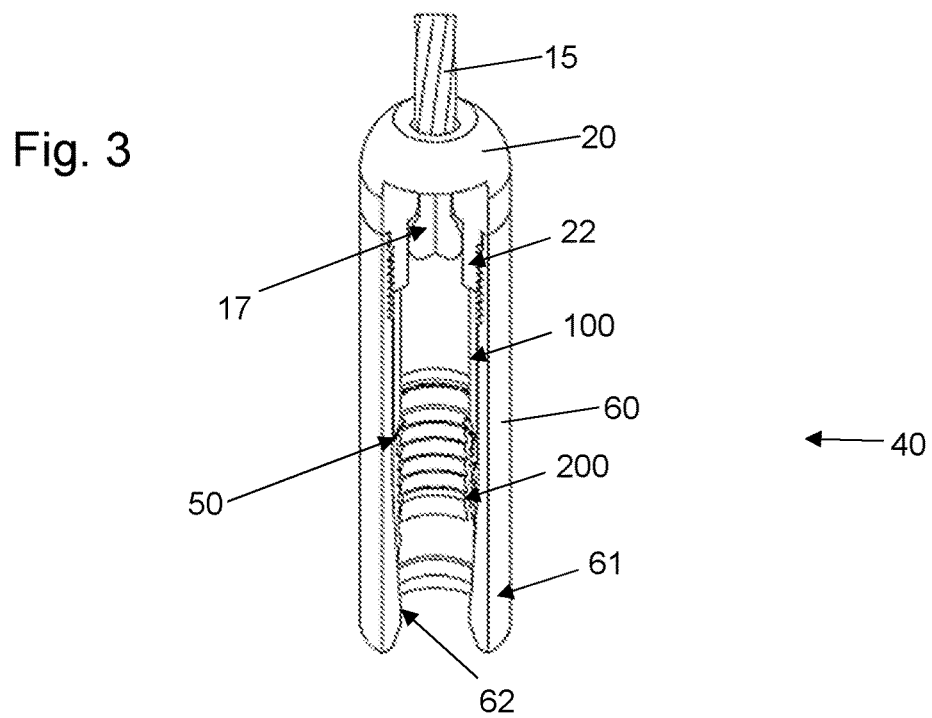

CABLE SECURING DEVICE

TECHNICAL FIELD

The present disclosure relates to a cable securing device that facilitates connection with a cable end and pulling the cable.

BACKGROUND

Proper wiring and cable management in building structures is essential to the safe and effective operation of the building's electrical and cabling operation. Further, proper connection to a cable, wire, pipe, tube or similar elongated element is important to maintaining a sufficient grip on the element.

When wiring or cabling needs to be protected from potential damage, it can be pulled through various types of conduits. Conduit can be made of metal, rigid plastic (e.g., PVC) and other materials, and wiring or cabling can vary from very thin wires that may be bundled for passage through a conduit to very thick cables that may not be joined to any other wires or cabling when passed through a conduit. Further, piping, tubing and other larger elements that require pulling must be sufficiently connected to the pulling device to complete the task, whether it will be pulled through a conduit or not. For purposes of the present disclosure, the term "cable" or "cabling" may be used throughout the present disclosure to refer to any type of wire, cable, piping, tubing or similar elongated element that can be inserted and pulled, whether through a conduit or otherwise.

While conduit can be lengthy and provided with curves as necessitated by a building's structure, it can be difficult to pull cabling through even short lengths of conduit. Traditionally, tools such as electrician's fish tape have been used to attach to the end of a cable and pull the cable through the conduit. Generally, fish tapes are made of strong material such as steel to support pulling loads and have a loop on one end to which the end of the cable can be secured. In instances where the cable being pulled is not insulated, or where the insulation has been stripped at the end secured to the fish tape, electrical tape may be applied to the bare segments of the cable. Other methods besides using fish tape, such as pushing or wiggling cable through conduit, for example, have been tried with generally unsatisfactory results.

Further, in large diameter wire, cabling, tubing or pipe, a compression device can be used to compress and/or crimp the cable end. The cabling is then pulled, for example, through a conduit, and the compressed or crimped end is cut off and thrown away.

Unfortunately, the fish tape method, compression method and other methods of cable pulling do not always work properly, and if the fish tape or compressed portion of the device separates from the cable during the process of pulling the cable through a conduit, it can be very difficult to remove the inserted cable to re-start the process. Oftentimes in such situations, the conduit must be removed and/or broken to obtain access to the end of the cable, which can be extremely costly and time-consuming.

SUMMARY OF DISCLOSURE

The present disclosure provides, in part, a push-on cable securing device, assembly and method that facilitates the secure connection of cabling ends for pulling the cabling, whether through a conduit or otherwise, without a compression tool, without damage to the cabling and while minimizing risk of detachment during the pulling process.

In various embodiments, the device and assembly can employ a retaining cap, a barrel or tube with a tapered interior wall and a cable receiving component. The cable receiving component can include a spacer gland, a fastening ring and a retaining jaw, or a subset thereof, and the elements of the cable receiving component may either be joined together as individual elements or provided as an integrated cartridge. In embodiments, a first fastening device in the form of a retaining jaw is inserted into the barrel, followed by a second fastening device in the form of a fastening ring, followed by the spacer gland. Each of these elements is axially movable within the barrel along the barrel's axis when installed and when removed; however, each element is retained in a substantially axially static position within the barrel when the device is fully assembled with the retaining cap fully secured to the barrel. In various embodiments, the barrel can be provided with a thread at one end for securely engaging the retaining cap, and an internal taper at the other end. One end of the retaining cap has a thread for mating with the barrel's thread. The retaining cap is also formed with a central opening through which a rigid lanyard may extend. In various embodiments, a bulb or shank ball segment of the rigid lanyard is retained within the interior of the retaining cap such that, as the rigid lanyard is pulled, the shank ball segment engages the retaining cap and the full device with barrel and cable receiving component can be pulled as a unit.

When a cable is inserted into the opening of the barrel opposite the lanyard, the cable engages the cable receiving component as the cable extends back to the inner edge of the retaining cap, after which time the jaws of the fastening device and the fastening ring grip the outer edge of the cable. In various embodiments, the device adapts to a cable that may have its insulation stripped at the outer tip, such that internal wires are inserted into the opening of the barrel. In such cases, the retaining jaw and fastening ring grip the internal wires of the cable. Once the cable and/or internal wires are gripped, the cable is in the secure grasp of the fastening device. At such time, a fish tape or other pulling apparatus can be secured to the loop in the rigid lanyard for pulling the cable. Embodiments of the device as disclosed herein can provide over 10,000 pound-force of resistance and thereby improve performance with fewer internal elements and reduced necessity for moving parts.

In various embodiments, the retaining jaw has axial slits that separate different gripping components of the retaining jaw. In various embodiments, one of the slits extends completely along the axial length of the retaining jaw, forming a split in the retaining jaw device. While the elements held within the barrel are axially movable along the interior surface of the barrel, in various embodiments, once the retaining cap is in place, the retaining jaw, fastening ring and spacer gland do not move axially within the barrel, even when engaging an inserted cable.

BRIEF DESCRIPTION OF THE DRAWINGS

FIG. 1 is a front perspective view of one embodiment of a cable securing device in accordance with the present disclosure.

FIG. 2 is a front perspective view of the device of FIG. 1 in partial cross-section.

FIG. 3 is an enlarged view of encircled portion 3-3 of FIG. 2.

DETAILED DESCRIPTION OF EMBODIMENTS

Figure 4:
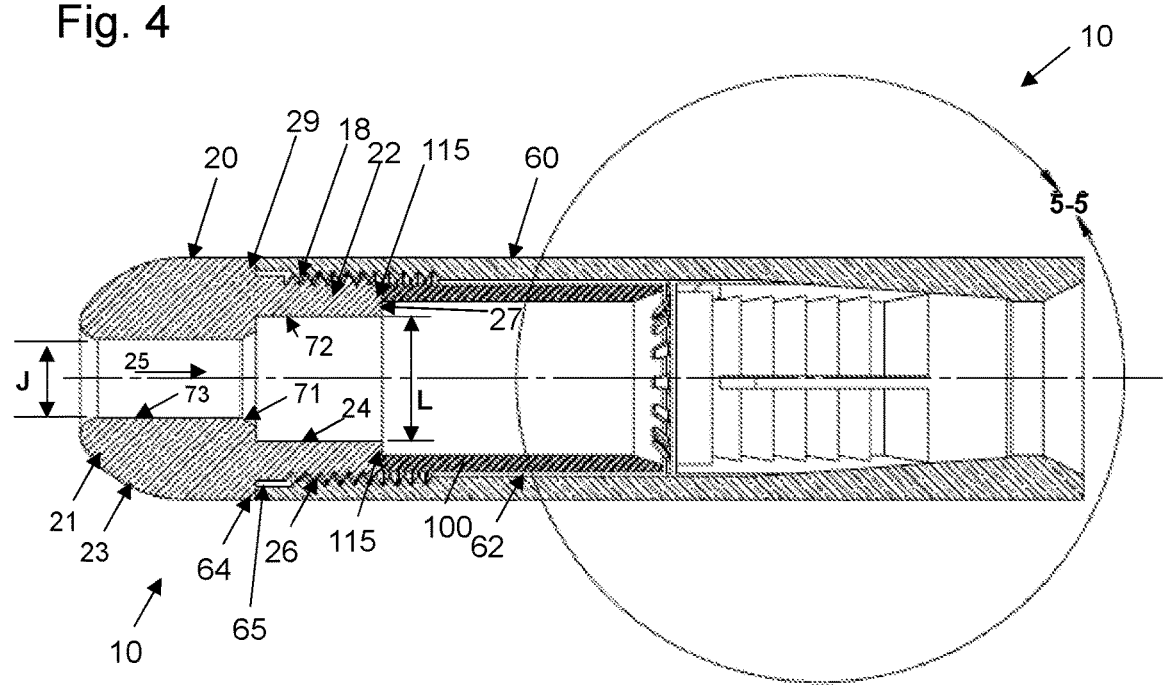
FIG. 4 is a cross-sectional view of the barrel member engaged with the retaining cap and with inserted elements in the barrel in accordance with embodiments of the present disclosure.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or more than one of the described element. Thus, for example, reference to teeth may encompass one or more sets of teeth, and so forth.

In the cable securing device 10 according to embodiments of the present disclosure as shown in FIGS. 1 through 14, elements as shown include: a retaining cap 20, a barrel 60 and a cable receiving component 40. The cable receiving component 40 can include a spacer gland 100, a fastening ring 50 and a retaining jaw 200, or a subset thereof. The cable receiving component 40 may be formed as individual elements joined together or may be provided as an integrated cartridge.

As shown in FIGS. 1 through 3, a lanyard 15 is provided with a body segment 16, shank ball segment 17, clasp 18 and end loop segment 19. The lanyard 15 may or may not be considered part of the cable securing device 10 depending upon the nature of the embodiments of the present disclosure. In various embodiments, the shank ball segment 17 is integrally formed with the body segment 16 so as to provide a monolithic structure, and the end loop segment 19 can be crimped or clasped as with clasp 18 so as to form a loop, which facilitates the secure connection of a fish tape or other external device having a latch or other mechanism securable to the loop segment 19 for pulling, as described in more detail hereafter. In various embodiments, the lanyard can be made of steel or other rigid material. The shank ball segment 17 is formed of a size appropriate to engage an interior surface portions (e.g., 71, 72) of an interior surface 24 of the retaining cap 20 (see FIG. 4). This facilitates a secure engagement such that when the lanyard 15 is pulled, it will pull the barrel 60 and its contents during operation.

As shown in FIGS. 4, 7, 9 and 11, the retaining cap 20 can be formed as a monolithic element with a head segment 21, an axially extending body segment 22, an outer surface 23 and an inner surface 24 defining a bore hole 25 extending axially therethrough. The outer surface 18 of the body segment 22 can be provided with a threaded exterior as at 26, although in alternative embodiments, the body segment inner surface 24 can be provided in threaded form. It will be appreciated that body segment 22 is formed with a radially extending edge 27 that extends radially inwardly of the barrel interior surface 62 when connected with the barrel 60, which permits the radially extending edge 27 of the body segment 22 to provide mating contact and resisting force to spacer gland 100 during operation. The retaining cap inner surface 24 can be formed such that the bore hole 25 does not have a constant diameter, but rather has a diameter J associated with head segment 21 and a diameter L associated with body segment 32. As shown in FIG. 4, diameter J is smaller than diameter L, as the interior surface 72 of body segment 32 associated with diameter L assists in retaining the shank ball segment 17 of the lanyard during operation. The inner surface 24 of the retaining cap 20 can further be provided with an angled interior surface portion 71 extending from the interior surface portion 72 to the head segment interior surface portion 73. Angled interior surface portion 71 also assists in retaining the shank ball segment 17 of the lanyard during operation. In addition to providing a resisting force to spacer gland 100 during operation, the radially extending edge 27 of the body segment 22 can further assist in providing resisting force when a cable 90 is inserted. The shank ball segment 17 (not shown in FIGS. 4, 7, 8 and 11) can also contribute to providing resisting force to an inserted cable 90. Such resisting force prevents the cable 90 from being pinched or otherwise deformed if it were to extend further into the bore hole 25 of the retaining cap 20. In various embodiments, the retaining cap 20 is made of steel or other rigid material and is formed with a radially inwardly extending ledge 29 at the base of the head segment 21, wherein the ledge 29 extends to the body segment 22. The ledge 29 assists in providing a stopping force against the barrel 60 when the retaining cap 20 and barrel 60 are fully engaged.

Figure 5:
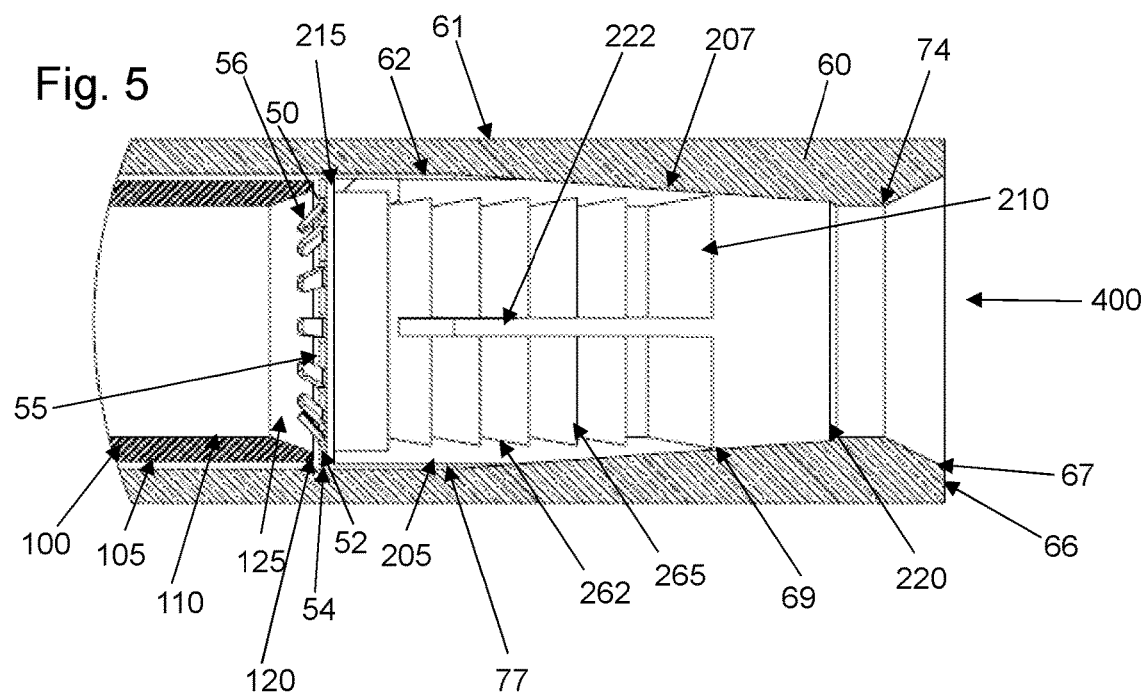
FIG. 5 is an enlarged view of encircled portion 5-5 of FIG. 4.
Figure 6:
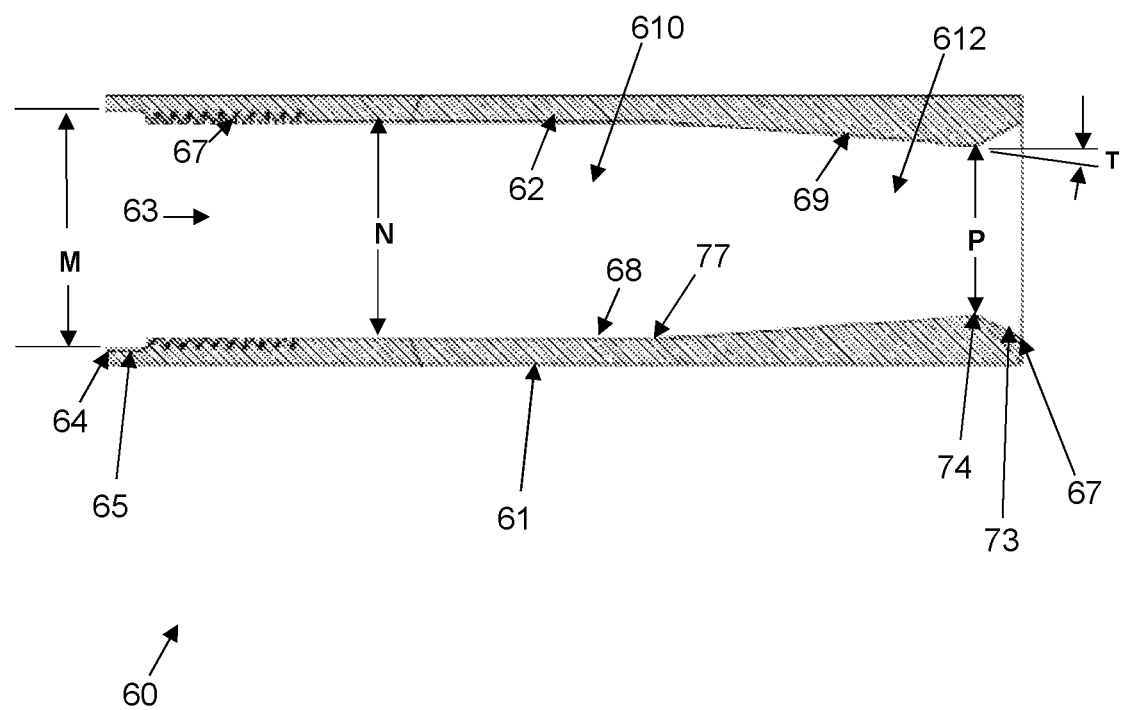
FIG. 6 is a cross-sectional view of the barrel member in accordance with embodiments of the present disclosure.

As shown in FIGS. 1 through 6, for example, embodiments of the barrel 60 can be formed as a monolithic, single-body component with an exterior surface 61 and an interior surface 62 defining an interior cavity 63 extending axially therethrough. The exterior surface 61 can be substantially cylindrical, or tubular, as shown. A first end surface 64 extends radially inwardly from the exterior surface 61 to an axially extending inner radial lip 65. A second end surface 66 of the barrel 60 extends radially inwardly from the exterior surface 61 to an interior edge 67. In various embodiments, a portion 73 of the interior surface 62 of the barrel 60 extends axially and radially inwardly from the interior edge 67 to a tapered edge 74. As shown in the exemplary embodiment of FIG. 6, the barrel interior surface 62 has its largest diameter M at inner radial lip 65, which accommodates the retaining cap 20 during operation. The barrel interior surface 62 further tapers from a larger relative diameter N at segment 68 to a tapering segment 69 having a variable diameter P, down to the axially extending inner radial lip 65. The segments 68 and 69 can meet at a radial inflection point 77, as shown in FIGS. 5 and 6, for example. The barrel interior surface 62 thus has a substantially cylindrical portion 610 and a substantially frustoconical portion 612, with the substantially frustoconical portion 612 shown at tapering segment 69. In various embodiments, diameter N is constant and is larger than diameter P, and both diameters M and N are larger than diameter P. The tapered interior surface 62 of barrel 60 facilitates the operation of the retaining jaw 200 as described in more detail hereafter. In various embodiments, the taper angle T is constant and can range from approximately ten degrees to approximately thirty degrees, depending upon the implementation. For example, in situations where a shorter barrel 60 is required, angle T may be higher. In various embodiments, the barrel 60 is formed of steel or other rigid material.

Figure 11:
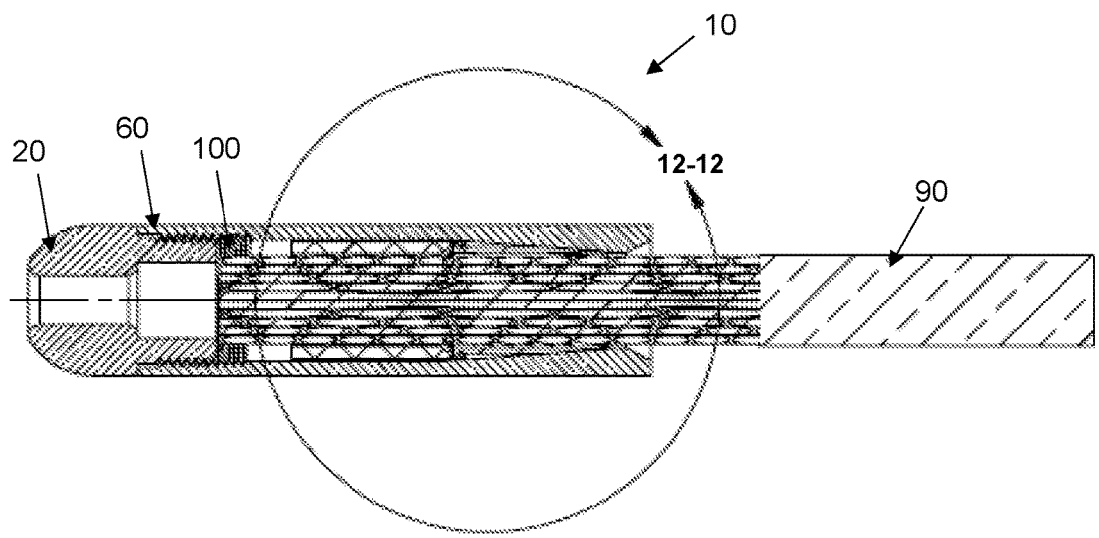
FIG. 11 is a cross-sectional view of the device according to embodiments of the present disclosure with a cable inserted through the device and retained by the fastening ring and retaining jaw elements.
Figure 12:
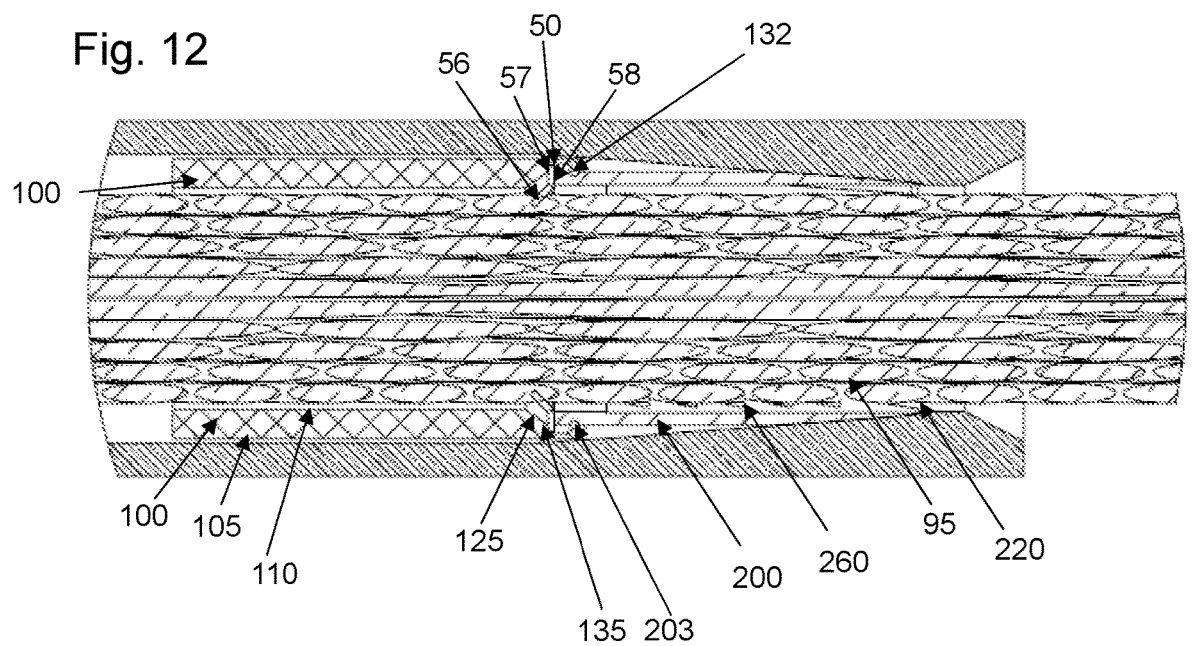
FIG. 12 is an enlarged view of encircled portion 12-12 of FIG. 11.
Figure 13:
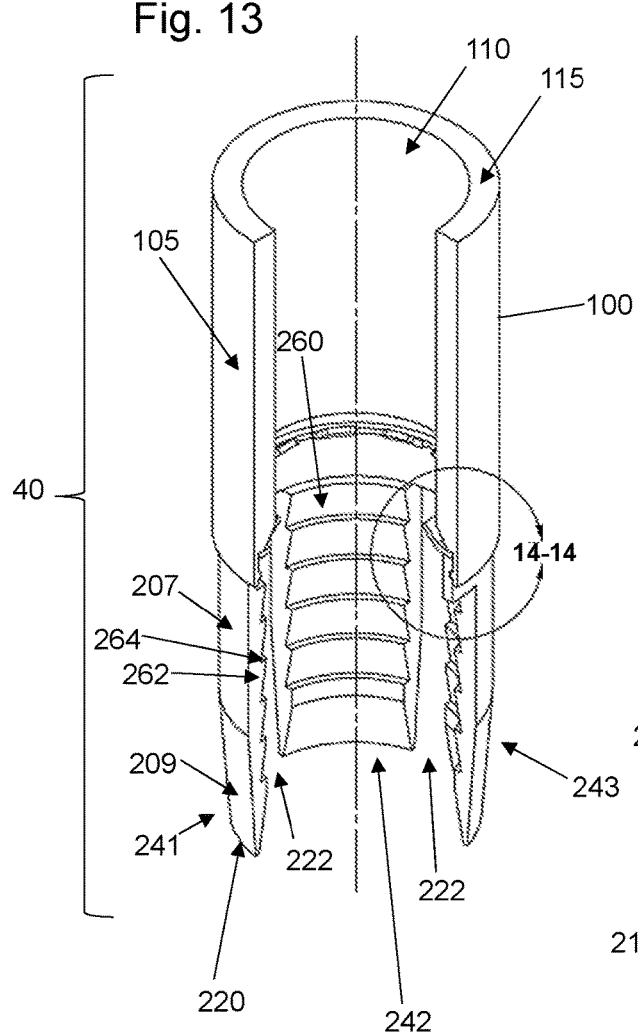
FIG. 13 is a cross sectional view of a cable receiving component in accordance with embodiments of the present disclosure.
Figure 14:
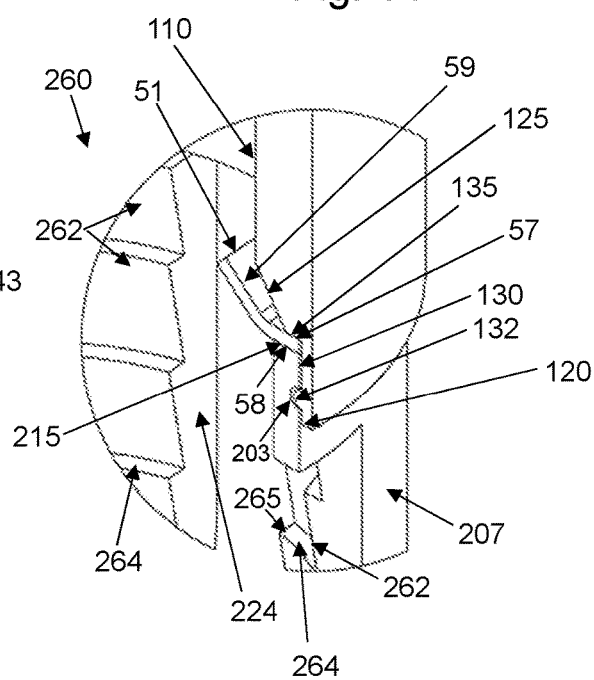
FIG. 14 is an enlarged view of encircled portion 14-14 of FIG. 13.

As shown in FIGS. 3 through 16, for example, embodiments of the spacer gland 100 can be formed as a monolithic, single-body component with an exterior surface 105 and an interior surface 110 defining an interior cavity extending axially therethrough. The exterior surface 105 can be substantially cylindrical, or tubular, as shown. A first end surface 115 extends radially inwardly from the exterior surface 105 to the interior surface 110 and is adapted to engage the radially extending edge 27 of the body segment 22 of the retaining cap 20 when installed. As shown in FIGS. 5, 8, and 10, in various embodiments, a second end surface 120 of the spacer gland 100 extends radially inwardly from the exterior surface 105 to an angled inner ridge 125. The angled inner ridge 125 extends radially and axially inwardly from the second end surface 120 to the interior surface 110 and thus forms a frustoconical portion of the interior surface 110 of the spacer gland 100. In various alternative embodiments, as shown in FIGS. 12 through 14, the second end surface 120 of the spacer gland 100 extends radially inwardly from the exterior surface 105 to an axially extending lip 130 having a radially inwardly extending nub 132 formed thereon. In various embodiments, the nub 132 is formed with a substantially semi-circular cross-section for mating with an indentation 203 in the retaining jaw 200 as described elsewhere herein. The mating of the nub 132 with the indentation 203 facilitates fixed engagement of the spacer gland with the retaining jaw. The axially extending lip 130 can be formed with a diameter that is larger than the diameter of the interior surface 110 of the spacer gland 100 in order to retain fastening ring 50 when fastening ring 50 is installed with the spacer gland 100. In various embodiments, such as shown in FIG. 12 through 14, the axially extending lip 130 extends axially inwardly from the second end surface 120 of the spacer gland 100 to a radially inwardly extending ledge 135. The radially inwardly extending ledge 135 provides a surface for mating with the first face 57 of the fastening ring base 52 as described elsewhere herein. In the embodiments of FIGS. 12 through 14, the angled inner ridge 125 extends radially and axially inwardly from the radially inwardly extending ledge 135 to the interior surface 110. Regardless of embodiment, the angled inner ridge 125 can assist in providing resistance to the flexible teeth 56 of the fastening ring 50 during operation as described elsewhere herein. In various embodiments, the spacer gland 100 is formed of steel or other rigid material, and is resilient and not axially compressible.

As shown in FIGS. 5 through 16, for example, the fastening ring 50 can be formed as a monolithic element including a fastening ring rim or base 52 with a radially outer edge 54 and a radially inner surface 55 defining a fastening ring cavity 500. When the elements 100, 50 and 200 are inserted into the barrel 60, the first face 57 of the fastening ring base 52 engages the second end 120 of the spacer gland 100 (see, e.g., FIGS. 8 and 10) or the radially inwardly extending ledge 135 of the spacer gland 100 (see, e.g., FIG. 12), while the second face 58 of the fastening ring base 52 engages the end wall 215 of the retaining jaw 200. The fastening ring 50 can be an integral, unsplit ring or can be a split ring member. In the embodiments where the fastening ring is a split ring, the fastening ring can include two circumferential end points (not shown) that do not connect, with fixture points for handling and compressing the fastening ring, such that a tool designed to hold the fastening ring at the fixture points can more easily handle and compress the fastening ring in order to assist with assembly or disassembly. In this embodiment, and once compressed, the fastening ring is easily insertable into the barrel 60 by releasing the hold on the fixture points, thereby allowing the fastening ring to expand such that the radially outer edge 54 engages the interior surface 62 of the barrel 60. In various embodiments, the fastening ring 50 can comprise a spring steel formulation, for example, that enables the fastening ring to be malformed during installation, while springing back into its originally manufactured position once installed.

The fastening ring 50 is capable of grabbing an inserted cable's surface via two or more teeth 56. As shown in FIGS. 5 through 16, the fastening ring 50 includes a substantially cylindrical rim or base 52 that has a plurality of bifurcated or square edged teeth 56 extending axially and radially inwardly from the radially inner surface 55 of the fastening ring base 52. As shown in FIGS. 5 and 8, for example, the teeth 56 extend toward the inner surface 110 of the spacer gland 100 when at rest. The teeth 56 of the fastening ring 50 can extend at various angles from the base axis as measured when the teeth are at rest position and are not stressed by the insertion of a cable, for example. The number of teeth can readily vary in number and size. In various embodiments, the fastening ring teeth 56 are angled radially and axially inwardly from the substantially cylindrical perimeter of the ring 50, toward the spacer gland 100 and away from the retaining jaw 200, such that when a cable is inserted, the teeth 56 first extend radially outwardly to permit the cable to pass through, and then exert a pressure against the cable as it settles to discourage the cable from slipping or moving back out of the barrel 60. In various embodiments, each of the fastening ring teeth 56 is formed with a gripping edge 51, wherein the gripping edge 51 extends radially inwardly into the barrel interior cavity to engage the cable during operation. In various embodiments, the outer surface 59 of the teeth 56 extend to an angled inner ridge 125 of the inner surface 110 of the spacer gland 100 when stressed by the insertion of a cable, and then flex back in the opposite direction after the cable has been inserted to thereby grip the inserted cable and resist any axial movement of the cable back out of the barrel 60. The outer surface 59 of the teeth 56 may or may not contact the angled inner ridge 125 and/or inner surface 110 of the spacer gland 100 during operation. In various embodiments, the fastening ring 50 assists in allowing the cable receiving component 40 to securely engage an inserted cable while also preventing or minimizing any drifting of the cable once inserted, which can result in an unsatisfactory grip on an inserted cable.

As shown in FIGS. 3 through 16, the retaining jaw 200 can be provided in various forms and, in various embodiments, the retaining jaw 200 is formed of steel or other rigid material. As shown in FIGS. 13 through 16, for example, the retaining jaw 200 is provided as a unitary, monolithic element with an outer surface 205, an inner surface 210, an axially exterior edge or leading edge 220 at its first axial end and a trailing edge at its second axial end in the form of an axially interior, radially extending end wall 215. The outer surface 205 can be formed with an axially interior segment 207 and an axially exterior segment 209, wherein the axially interior segment 207 is substantially cylindrical and the axially exterior segment 209 is substantially frustoconical. In various embodiments, the axially exterior segment 209 of the outer surface 205 extends at an angle so as to mate in sliding engagement with the substantially frustoconical portion 612 (i.e., the tapered internal surface 69) of the interior surface of the barrel 60 during operation. The axially interior segment 207 can further be formed with a groove or indentation 203 for mating with the nub 132 of the spacer gland 100 as described elsewhere herein. In embodiments of the device of the present disclosure such as shown in FIGS. 4, 5 and 7 through 10, no groove or indentation is formed in the outer surface 205 of the retaining jaw 200. It will be appreciated that the cable receiving component 40 can be provided as individual elements (e.g., spacer gland 100, fastening ring 50 and retaining jaw 200) joined together or as a single integrated cartridge, regardless of whether formed with an indentation in the outer surface 205 of the retaining jaw 200 and a nub 132 on the spacer gland 100 as shown in the drawings.

Figure 15:
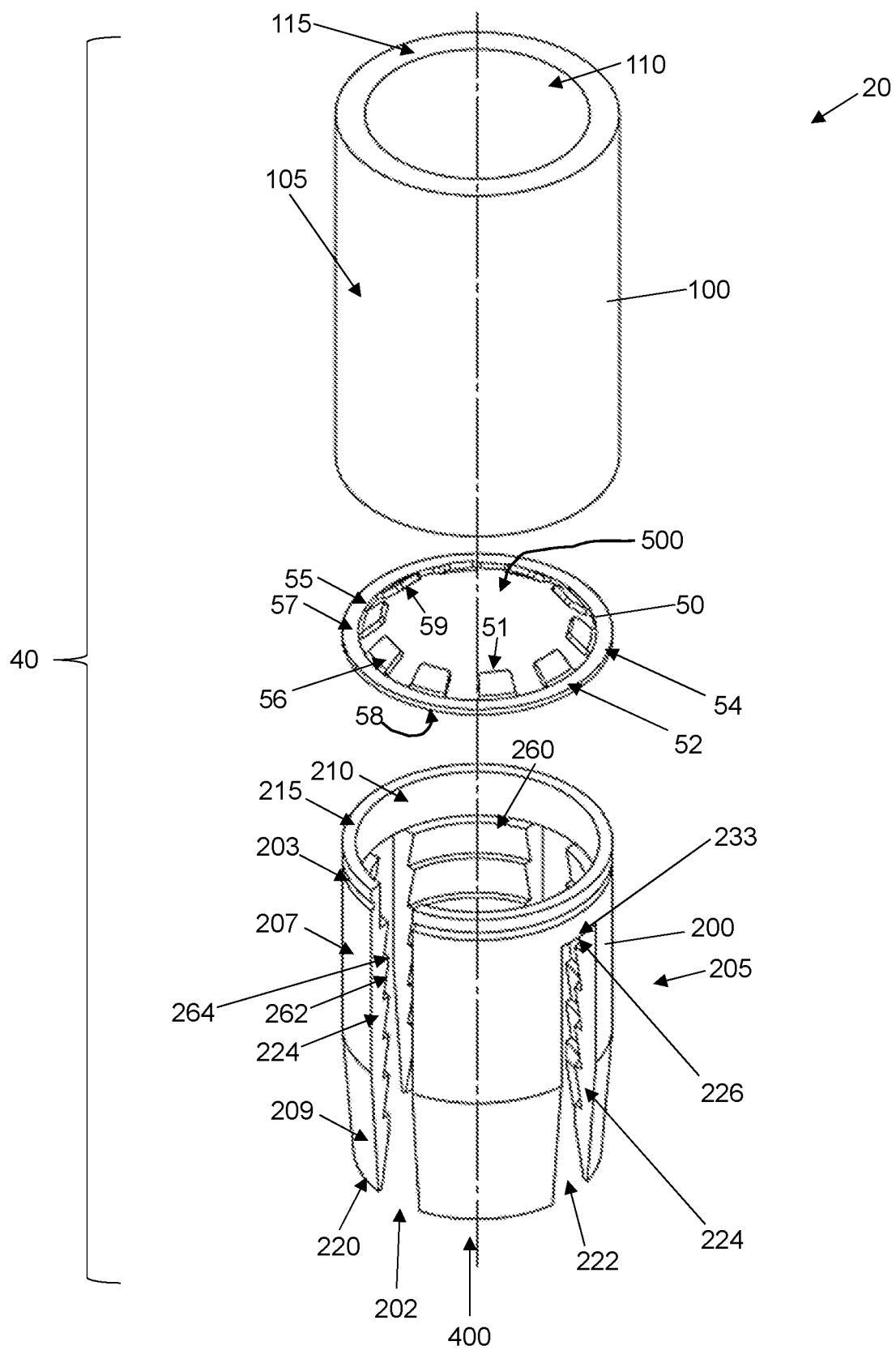
FIG. 15 is an exploded view of a cable receiving component in accordance with embodiments of the present disclosure.

As further shown in FIGS. 13 through 16, the retaining jaw 200 is formed with slots 222 defined by radially extending jaw walls 224 and axially extending jaw rims 226. The jaw rims 226 can be formed in the axially interior segment 207 of the outer surface 205 of the retaining jaw 200 and can extend radially to the inner surface 210 of the retaining jaw. The jaw walls 224 can extend axially outwardly from a position (e.g., 233 in FIGS. 15 and 16) that is axially between the end wall 215 and the exterior edge 220 to the exterior edge 220 of the retaining jaw 200. Thus, the slots 222 extend through the axially exterior segment 209 of the outer surface 205 of the retaining jaw 200 and a portion of the axially interior segment 207 of the outer surface 205 of the retaining jaw 200. In the embodiment of the retaining jaw 200 as shown in FIG. 15, one of the slots can extend fully through the axially interior segment 207 of the outer surface 205 of the retaining jaw 200 to form a split 202. The split 202 can assist with manipulating the retaining jaw 200 during installation, as the split 202 results in less resistance to radial compression of the retaining jaw 200 such that the retaining jaw 200 may more readily be inserted into the barrel interior 62.

Figure 16:
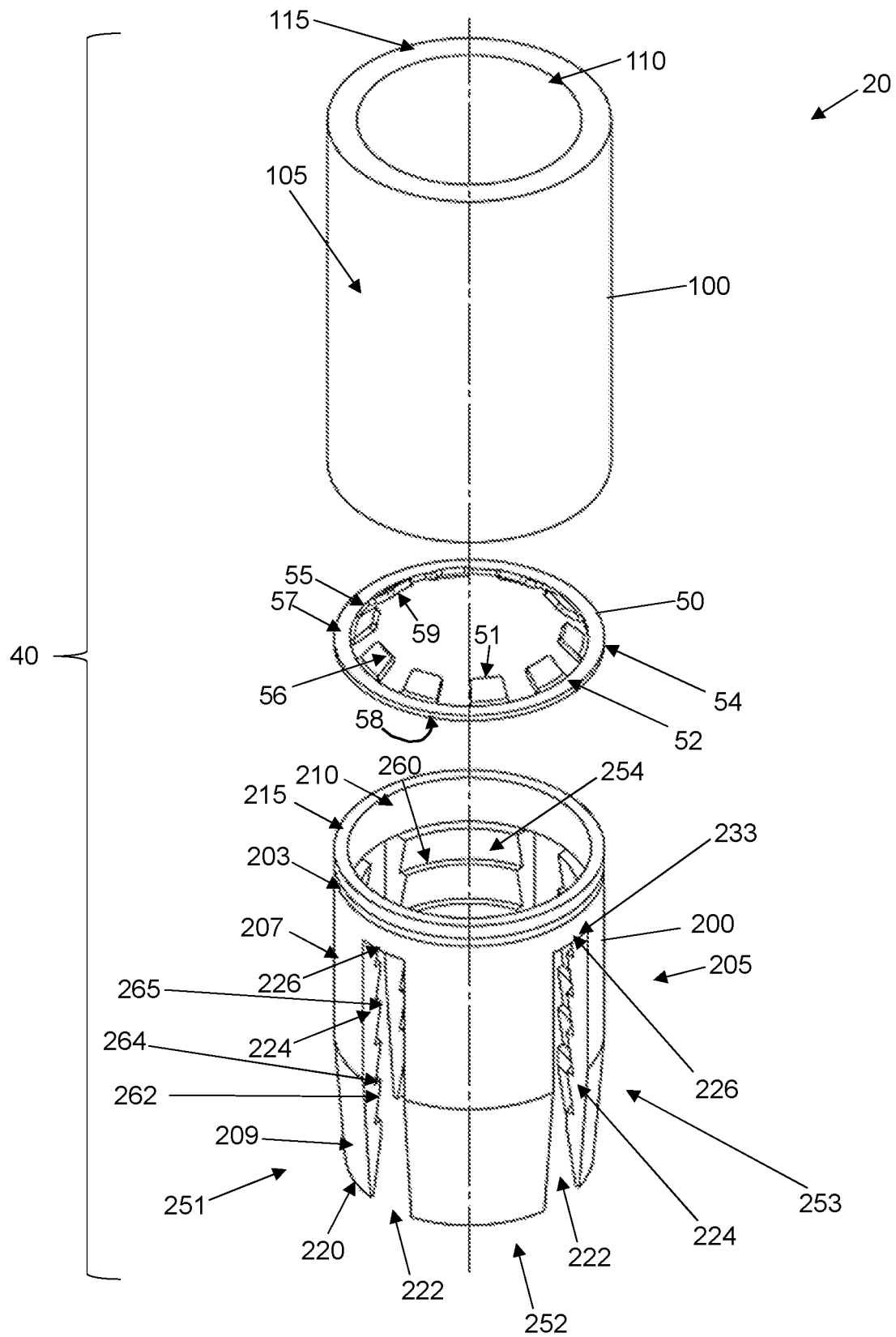
FIG. 16 is an exploded view of an alternative cable receiving component in accordance with embodiments of the present disclosure.

The slots 222 and/or split 202 form multiple jaw members, as shown in FIGS. 13 through 16. The number of jaw members can vary depending upon the embodiment. For example, as shown in FIG. 13, three jaw members 241, 242 and 243 are formed. In FIG. 16, four jaw members 251, 252, 253 and 254 are formed. Regardless of number, each jaw member can be formed with a respective leading edge corresponding to exterior edge 220 at the axially outer end of the jaw member and a gripping segment such as jaw teeth 260. The jaw teeth 260 can be formed with riser segments 262 and radially inwardly extending ridges 264, wherein the riser segments 262 extend radially and axially inwardly from the jaw walls 224 and wherein the riser segments 262 and ridges 264 meet at a radially inner edge 265 which forms a sharpened peak for pinching an inserted cable. In various embodiments, the riser segments 262 are formed with a greater surface area than the ridges 264, which assists in facilitating the insertion of a cable while also providing for significant gripping force after the cable has been inserted so as to resist movement of the cable axially outwardly of the barrel 60.

FIGS. 4 through 12 illustrate different stages of operation of the device and assembly of the present disclosure. Prior to insertion of a cable 90, as shown in FIGS. 4 and 5, the device 15 is loaded such that the cable receiving component 40 (e.g., retaining jaw 200, fastening ring 50 and spacer gland 100) is inserted into the barrel 60. For example, the fastening ring 50 may be secured between the retaining jaw 200 and spacer gland 100 as described above and shown in the drawings, and the retaining jaw 200 may be secured to the spacer gland 100 via the nub 132 and indentation 203 as shown in FIG. 14. The retaining jaw inner surface 210, the fastening ring radially inner surface 55 and the spacer gland interior surface 110 define a cable receiving cavity 400. As disclosed elsewhere herein, the cable receiving component 40 can comprise multiple elements assembled and positioned together or can alternatively comprise a single, pre-joined and integrated device. Regardless of form, the cable receiving component 40 can be inserted into the barrel 60 such that the axially exterior segment 209 of the retaining jaw exterior surface 205 engages the tapered interior surface 69 of the barrel 60. The retaining cap 20, with the lanyard body segment 16 extending through the bore hole 25 in the retaining cap 20 such that the shank ball segment 17 is maintained within the interior of the retaining cap 20, is then secured to the barrel 60 such as by threaded engagement as shown in FIGS. 4 and 5. As the retaining cap 20 and barrel 60 are secured, the radially extending edge 27 of the retaining cap body member 22 engages end surface 115 of the spacer gland 100, thereby maintaining the cable receiving component securely within the barrel interior so as to prevent axial movement of the cable receiving component during operation.

Figure 7:
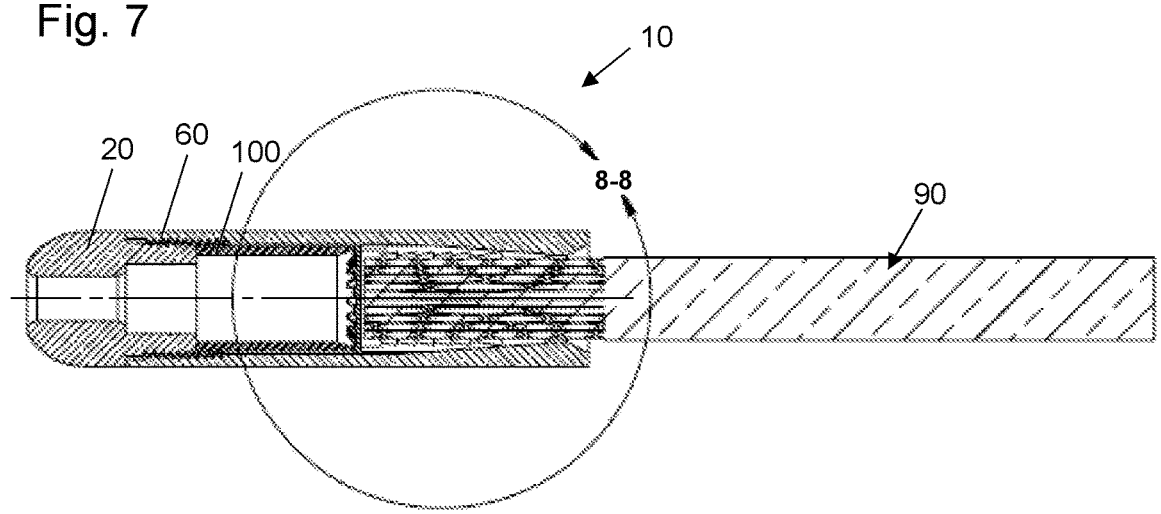
FIG. 7 is a cross-sectional view of the device according to embodiments of the present disclosure with a cable inserted through the retaining jaw element of the device.
Figure 8:
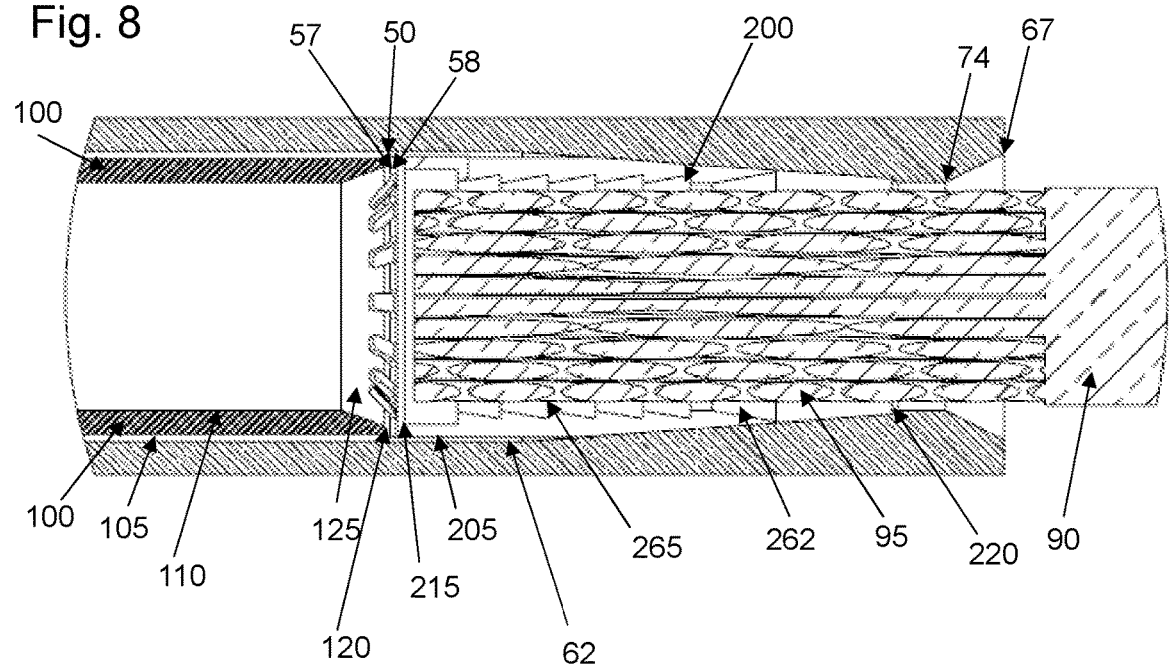
FIG. 8 is an enlarged view of encircled portion 8-8 of FIG. 7.

A cable 90 is inserted as shown in FIGS. 7 and 8. While the cable 90 is shown in FIGS. 7 through 12 with insulation stripped so as to expose internal wires or other elements 95, it will be appreciated that the embodiments of the present disclosure work with and accommodate both insulated as well as uninsulated cables, wiring and other elements. It will be appreciated that the cable is not necessarily considered an element of the device and component as presently disclosed.

As shown in FIGS. 7 and 8, and during operation, a cable 90 is inserted into the opening of the barrel 60. The exposed portion 95 of the cable 90 extends past the tapered edge 74 of the barrel 60 and past the edge 220 and through the retaining jaw 200. The retaining jaw 200 is maintained securely within the barrel 60 and does not slide axially as the cable is inserted. The pressure from the inserted cable 90 against the jaw teeth 260 does not result in the retaining jaw 200 moving radially inwardly, yet the jaw teeth 260 maintain engagement with the inserted cable 95 while permitting the cable 95 to pass through.

Figure 9:
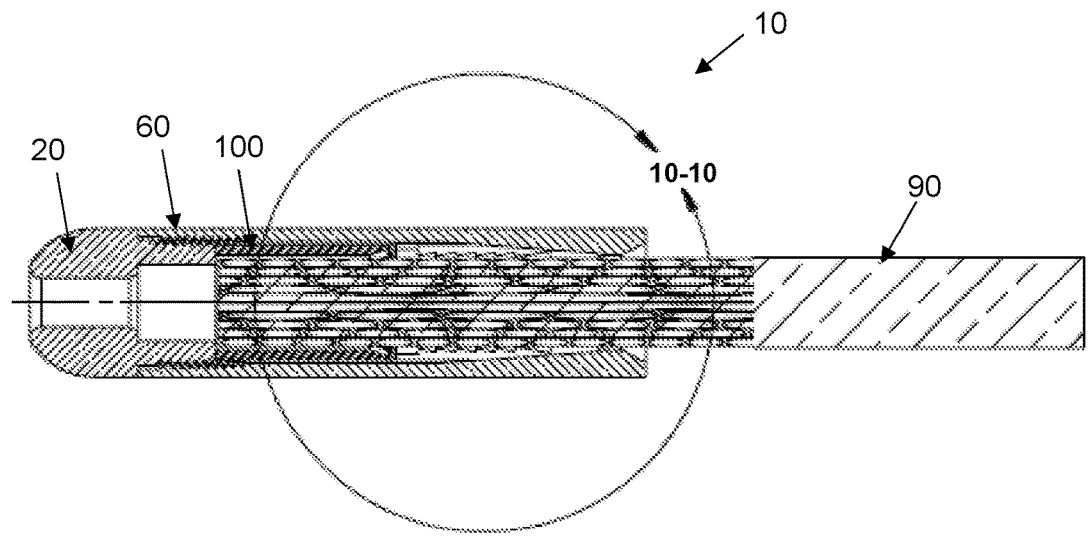
FIG. 9 is a cross-sectional view of the device according to embodiments of the present disclosure with a cable inserted through the retaining jaw, fastening ring and spacer gland elements of the device.
Figure 10:
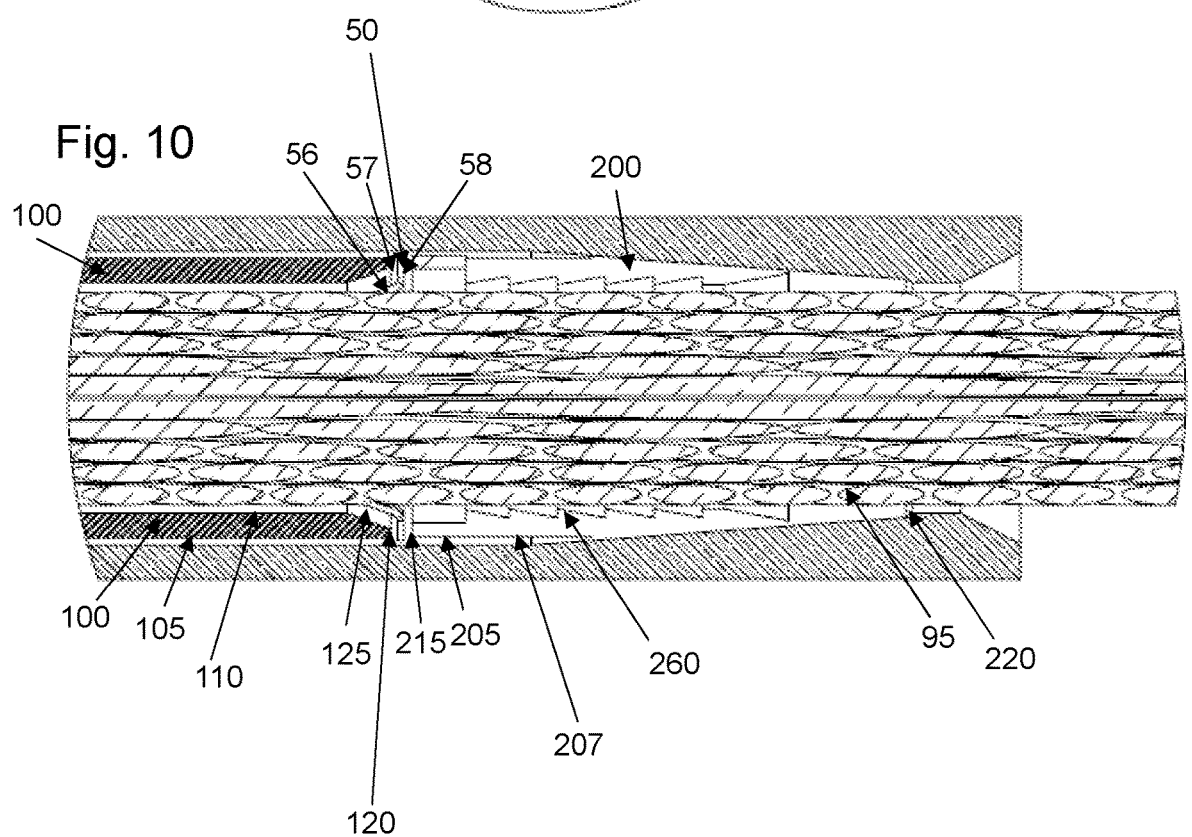
FIG. 10 is an enlarged view of encircled portion 10-10 of FIG. 9.

As shown in FIGS. 9 and 10, as the cable element 95 is pushed further into the barrel 60, it passes the fastening ring 50 and spacer gland 100. In doing so, the fastening ring teeth 56 are flexed radially outwardly so as to permit the inserted cable element 95 to pass. As described elsewhere herein, the fastening ring teeth 56 may flex to the point of engaging angled inner ridge 125 of the spacer gland interior surface 110. The cable element 95 can extend until it reaches resistance from the radially extending edge 27 of the retaining cap body member 22. As shown in FIGS. 11 and 12, once the cable element 95 is fully inserted, any movement of the cable axially outwardly of the barrel 60 is resisted by the fastening ring teeth 56 and the jaw teeth 260, and it will be appreciated that the fastening ring teeth 56 will flex back from the position attained during insertion of the cable element 95 to a position where the edges 51 of the teeth 56 pinch the inserted cable element 95. At such time, the retaining jaw 200 is immediately and evenly engaged so as to remain in alignment and assist in securely engaging the inserted cable. Further, at such time, a fish tape or other device can be secured to the loop 12 in the rigid lanyard 15 for pulling the cable 90, such as through or outside of a conduit.

It will be appreciated that the cable receiving component remains in a substantially axially static position within the barrel when the device is fully assembled with the retaining cap fully secured to the barrel, regardless of the action of the inserted cable. Further, the threaded engagement of the retaining cap 20 with the barrel 60 permits ease of assembly and disassembly of the device.

The angles, dimensions and materials described herein will be understood to be exemplary and provided as embodiments associated with proper working operation of the device, assembly and method as presently disclosed. Further, it will be appreciated that, in various embodiments, the members of the device and assembly disclosed herein can be formed through hydroforming processes.

The device, assembly and method as presently disclosed may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A cable securing device, comprising:
a barrel comprising an interior surface comprising a substantially cylindrical portion and a substantially frustoconical portion, wherein the interior surface defines an interior cavity;
a retaining cap secured to the barrel and comprising a body segment extending into the interior cavity of the barrel, wherein the body segment comprises a radially extending edge;
a spacer gland maintained within the substantially cylindrical portion of the interior cavity of the barrel, wherein the spacer gland comprises first and second ends and an interior surface defining a spacer gland cavity;
a retaining jaw maintained within the substantially cylindrical portion and the substantially frustoconical portion of the interior cavity of the barrel, wherein the retaining jaw comprises a leading edge at a first axial end, a trailing edge at a second axial end and a radially interior surface comprising a gripping segment, wherein the retaining jaw further comprises an interior surface defining a retaining jaw cavity; and
a fastening ring maintained within the interior cavity of the barrel between the second end of the spacer gland and the trailing edge of the retaining jaw, wherein the fastening ring comprises a radially inner surface defining a fastening ring cavity, and wherein the spacer gland, the retaining jaw and the fastening ring are retained in a substantially axially static position within the barrel upon insertion of a cable through the retaining jaw cavity, the fastening ring cavity and the spacer gland cavity.

2. The cable securing device of claim 1, wherein the retaining jaw comprises an outer surface formed with an axially interior segment and an axially exterior segment, wherein the axially interior segment is substantially cylindrical and the axially exterior segment is substantially frustoconical, wherein the axially interior segment of the outer surface of the retaining jaw is maintained within the substantially cylindrical portion of the interior surface of the barrel and wherein the axially exterior segment of the retaining jaw is maintained within the substantially frustoconical portion of the interior surface of the barrel.

3. The cable securing device of claim 1, wherein the retaining jaw is formed with a plurality of slots defining a plurality of jaw members, wherein the gripping segment comprises a plurality of jaw teeth formed on each jaw member of the plurality of jaw members.

4. The cable securing device of claim 3, wherein the retaining jaw is formed with a split between two of the plurality of jaw members.

5. The cable securing device of claim 1, wherein the fastening ring comprises a rim and a set of teeth extending toward the interior surface of the spacer gland.

6. The cable securing device of claim 1, wherein the spacer gland first end is in mating contact with the radially extending edge of the retaining cap.

7. The cable securing device of claim 1, wherein the spacer gland is maintained within the substantially cylindrical portion of the interior surface of the barrel.

8. The cable securing device of claim 1, wherein the fastening ring is maintained within the substantially cylindrical portion of the interior surface of the barrel.

9. The cable securing device of claim 1, wherein the interior surface of the spacer gland is formed with a radially inwardly extending nub, wherein the axially interior segment of the outer surface of the retaining jaw is formed with an indentation adapted to mate with the nub to facilitate engagement of the spacer gland with the retaining jaw.

10. A cable securing device, comprising:
a barrel comprising an interior surface defining an interior cavity, wherein the interior surface of the barrel comprises a substantially frustoconical portion;
a retaining cap secured to the barrel and comprising a body segment extending into the interior cavity of the barrel, wherein the body segment comprises a radially extending edge; and
a cable receiving component maintained within the interior cavity of the barrel, wherein the cable receiving component comprises:

a retaining jaw formed with a leading edge, a trailing edge and an inner surface comprising a gripping segment;

a fastening ring formed with a rim comprising a first face, a second face, a radially inner surface and fastening ring teeth, wherein the second face engages the trailing edge of the retaining jaw; and a spacer gland, wherein the spacer gland is formed with an interior surface, a first end and a second end, wherein the second end of the spacer gland engages the first face of the fastening ring, wherein the inner surface of the retaining jaw, the radially inner surface of the fastening ring and the interior surface of the spacer gland define a cable receiving cavity and are retained in a substantially axially static position within the barrel upon insertion of a cable into the cable receiving cavity, and wherein the cable receiving component is maintained in substantially axially static position between the retaining cap and the frustoconical portion of the interior surface of the barrel.

11. The cable securing device of claim 10, wherein the cable receiving component is maintained in substantially axially static position within the barrel by the retaining cap and the interior surface of the barrel.

12. The cable securing device of claim 10, wherein the fastening ring teeth extending axially and radially inwardly from the fastening ring rim toward the interior surface of the spacer gland.

13. The cable securing device of claim 10, wherein the interior surface of the spacer gland is frustoconical for supporting the fastening ring teeth when a cable is inserted in the cable receiving cavity.

14. The cable securing device of claim 10, wherein the retaining jaw, the fastening ring and the spacer gland are formed as a cartridge.

15. The cable securing device of claim 10, wherein the retaining jaw is formed with a plurality of slots defining a plurality of jaw members, wherein the gripping segment comprises a plurality of jaw teeth formed on each jaw member of the plurality of jaw members.

16. The cable securing device of claim 15, wherein the retaining jaw is formed with a split between two of the plurality of jaw members.

17. The cable securing device of claim 10, wherein the interior surface of the spacer gland is formed with a radially inwardly extending nub, wherein the retaining jaw has an outer surface and wherein the outer surface of the retaining jaw is formed with an indentation adapted to mate with the nub to facilitate engagement of the spacer gland with the retaining jaw.

18. The cable securing device of claim 10, wherein the spacer gland first end engages the radially extending edge of the body segment of the retaining cap.

19. The cable securing device of claim 10, wherein the spacer gland and the fastening ring are maintained within a substantially cylindrical portion of the interior surface of the barrel.

20. A cable securing device, comprising:

a barrel comprising an interior surface defining an interior cavity;

a retaining cap secured to the barrel and comprising a body segment extending into the interior cavity of the barrel, wherein the body segment comprises a radially extending edge; and a cable receiving component maintained within the interior cavity of the barrel, wherein the cable receiving component comprises:

a retaining jaw formed with a leading edge, a trailing edge and an inner surface comprising a gripping segment, wherein the retaining jaw is formed with a plurality of slots defining a plurality of jaw members, wherein the gripping segment comprises a plurality of jaw teeth formed on each jaw member of the plurality of jaw members;

a fastening ring formed with a rim comprising a first face, a second face, a radially inner surface and fastening ring teeth, wherein the second face engages the trailing edge of the retaining jaw; and a spacer gland, wherein the spacer gland is formed with an interior surface, a first end and a second end, wherein the second end of the spacer gland engages the first face of the fastening ring, wherein the inner surface of the retaining jaw, the radially inner surface of the fastening ring and the interior surface of the spacer gland define a cable receiving cavity and are retained in a substantially axially static position within the barrel upon insertion of a cable into the cable receiving cavity.

21. A cable securing device, comprising:

a barrel comprising an interior surface defining an interior cavity;

a retaining cap secured to the barrel and comprising a body segment extending into the interior cavity of the barrel, wherein the body segment comprises a radially extending edge; and a cable receiving component maintained within the interior cavity of the barrel, wherein the cable receiving component comprises:

a retaining jaw formed with a leading edge, a trailing edge, an outer surface and an inner surface comprising a gripping segment;

a fastening ring formed with a rim comprising a first face, a second face, a radially inner surface and fastening ring teeth, wherein the second face engages the trailing edge of the retaining jaw; and a spacer gland, wherein the spacer gland is formed with an interior surface, a first end and a second end, wherein the second end of the spacer gland engages the first face of the fastening ring, wherein the interior surface of the spacer gland is formed with a radially inwardly extending nub, wherein the inner surface of the retaining jaw, the radially inner surface of the fastening ring and the interior surface of the spacer gland define a cable receiving cavity and are retained in a substantially axially static position within the barrel upon insertion of a cable into the cable receiving cavity, and wherein the outer surface of the retaining jaw is formed with an indentation adapted to mate with the nub to facilitate engagement of the spacer gland with the retaining jaw.

22. A cable securing device, comprising:

a barrel comprising an interior surface defining an interior cavity;

a retaining cap secured to the barrel and comprising a body segment extending into the interior cavity of the barrel, wherein the body segment comprises a radially extending edge; and a cable receiving component maintained within the interior cavity of the barrel, wherein the cable receiving component comprises:

a retaining jaw formed with a leading edge, a trailing edge and an inner surface comprising a gripping segment;

a fastening ring formed with a rim comprising a first face, a second face, a radially inner surface and fastening ring teeth, wherein the second face engages the trailing edge of the retaining jaw; and a spacer gland, wherein the spacer gland is formed with an interior surface, a first end and a second end, wherein the second end of the spacer gland engages the first face of the fastening ring, wherein the spacer gland first end engages the radially extending edge of the body segment of the retaining cap, wherein the inner surface of the retaining jaw, the radially inner surface of the fastening ring and the interior surface of the spacer gland define a cable receiving cavity and are retained in a substantially axially static position within the barrel upon insertion of a cable into the cable receiving cavity.

* * * * *